US007906166B2

(12) United States Patent
Wenger et al.

(10) Patent No.: US 7,906,166 B2
(45) **Date of Patent: *Mar. 15, 2011**

(54) PRECONDITIONER HAVING INDEPENDENTLY DRIVEN HIGH-SPEED MIXER SHAFTS

(75) Inventors: LaVon Wenger, Sabetha, KS (US); Marc Wenger, Sabetha, KS (US); Galen J. Rokey, Sabetha, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 294 days.

This patent is subject to a terminal disclaimer.

(21) Appl. No.: 12/268,557

(22) Filed: Nov. 11, 2008

(65) Prior Publication Data

US 2009/0067282 A1 Mar. 12, 2009

Related U.S. Application Data

(63) Continuation of application No. 11/875,033, filed on Oct. 19, 2007, now Pat. No. 7,674,492, which is a continuation-in-part of application No. 11/551,997, filed on Oct. 23, 2006, now Pat. No. 7,448,795.

(51) Int. Cl.
*A23L 1/0522* (2006.01)

(52) U.S. Cl. ......... 426/461; 426/510; 426/511; 426/523

(58) Field of Classification Search .................. 426/231, 426/233, 510, 511, 516, 461, 523
See application file for complete search history.

(56) References Cited

U.S. PATENT DOCUMENTS

| | | | | |
|---|---|---|---|---|
| 4,752,139 | A * | 6/1988 | Hauck | 366/298 |
| 5,026,689 | A * | 6/1991 | Ringe et al. | 514/57 |
| 5,932,264 | A * | 8/1999 | Hurd et al. | 426/511 |
| 6,291,008 | B1 * | 9/2001 | Robie et al. | 426/620 |
| 6,465,029 | B2 * | 10/2002 | Wenger et al. | 426/231 |
| 6,746,702 | B1 * | 6/2004 | Robie | 426/241 |
| 7,448,795 | B2 * | 11/2008 | Wenger et al. | 366/301 |
| 7,521,076 | B1 * | 4/2009 | Wenger et al. | 426/510 |
| 7,674,492 | B2 * | 3/2010 | Wenger et al. | 426/578 |
| 7,749,552 | B1 * | 7/2010 | Plattner et al. | 426/623 |
| 2001/0051198 | A1 * | 12/2001 | Robie et al. | 426/96 |
| 2007/0031575 | A1 * | 2/2007 | Green et al. | 426/629 |
| 2008/0160157 | A1 * | 7/2008 | Rutishauser et al. | 426/601 |
| 2009/0110802 | A1 * | 4/2009 | Pibarot et al. | 426/656 |
| 2009/0202689 | A1 * | 8/2009 | Peighambardoust et al. | 426/271 |

* cited by examiner

*Primary Examiner* — Drew E Becker
(74) *Attorney, Agent, or Firm* — Hovey Williams LLP

(57) ABSTRACT

An improved, dual-shaft preconditioner (10, 70, 102) is provided having independent drive mechanism (18, 20, 78, 80) operatively coupled with a corresponding preconditioner shaft (14, 16, 74, 76, 106, 108) and permitting selective rotation of the shafts (14, 16, 74, 76, 106, 108) at rotational speeds and directions independent of each other. Preferably, the speed differential between the shafts (14, 16, 74, 76, 106, 108) is at least about 5:1. The mechanisms (18, 20, 78, 80) are operatively coupled with a digital control device (60) to allow rotational speed and direction control. Preferably, the preconditioner (10, 70, 102) is supported on load cells (62, 100) also coupled with control device (60) to permit on-the-go changes in material retention time within the preconditioner (10, 70, 102). The preconditioner (10, 70, 102) is particularly useful for the preconditioning and partial gelatinization of starch-bearing feed or food materials, to an extent to achieve at least about 50% cook in the preconditioned feed or food materials.

8 Claims, 7 Drawing Sheets

PRECONDITIONER HAVING INDEPENDENTLY DRIVEN HIGH-SPEED MIXER SHAFTS

CROSS-REFERENCE TO RELATED APPLICATION

This application is a continuation of application Ser. No. 11/875,033, filed Oct. 19, 2007, which is a continuation-in-part of application Ser. No. 11/551,997, filed Oct. 23, 2006. Both of these prior applications are incorporated by reference herein in their entireties.

BACKGROUND OF THE INVENTION

1. Field of the Invention

The present invention is broadly concerned with improved, dual mixing shaft preconditioners of the type used upstream of processing devices such as extruders or pellet mills in the production of animal feeds or human foods. More particularly, the invention is concerned with such preconditioners, and processing systems making use thereof, wherein the preconditioners include variable drive mechanisms operably coupled with the mixing shafts and designed to permit selective rotation of the shafts at individual rotational speeds independent of each other.

2. Description of the Prior Art

Preconditioners are widely used in combination with extruders for preparing and blending food materials before further processing and cooking of the same in an extruder. For example, products having a relatively high percentage of flour-like material are often blended with water and treated with steam in a conditioner prior to extrusion. Use of preconditioners is particularly advantageous in preparing pet food or similar products comprising quantities of protein and starch. There are a myriad of pet food formulas in today's market, with widely varying ingredients and quantities thereof. For example, low-calorie pet foods are popular and include very high quantities of starch-bearing materials (e.g., corn and rice). Such low-calorie pet food formulations cannot be subjected to long retention times in a preconditioner, because the starch content thereof tends to become gummy and unsuitable for downstream extrusion processing. On the other hand, standard pet food formulas having far less starch and higher protein contents require long residence times to become properly preconditioned. Therefore, a preconditioner capable of only limited variability of terms of residence times is often not suitable for sophisticated pet food processors.

In recent years there has been an increase in the production of extrusion-processed aquatic feeds used in fish farming. Such aquatic feeds have traditionally included large quantities of fish meal (up to about 70% by weight). However, there is a trend away from using such large quantities of fish meals, owing to the cost and availability of such meal. In lieu thereof processors are using greater quantities of high protein plant ingredients such as soy. A problem with these plant protein sources is that most contain significant quantities of anti-nutritional factors, which must be destroyed during processing. This requires the application of moist heat over a period of time, usually in a preconditioner. Many conventional preconditioners are incapable of fully destroying such anti-nutritional factors, which detracts from their usefulness in the context of modern-day aquatic feeds.

Conventional preconditioning apparatus often includes an elongated vessel having a pair of identical side-by-side, frustocylindrical, intercommunicated mixing chambers each presenting equal areas in transverse cross sections. Each chamber is provided with mixing bars or beaters radially mounted on the rotatable drive shaft aligned with the longitudinal axis of the chamber, and the beaters have a configuration for longitudinally advancing the product from an inlet end of the vessel toward an outlet end of the same as the materials are swept around the frustocylindrical walls. Also, the beaters of each chamber are configured to alternatively pass the product from one chamber to the other when the materials approach the intersection between the chambers.

A series of water inlets are often provided along at least a portion of the length of preconditioning vessels for adding water to the food materials during advancement of the latter longitudinally through the mixing chambers. Obviously, it is highly important that water introduced into preconditioning vessels becomes thoroughly and uniformly blended with materials having a flour-like consistency in order to avoid formation of lumps. Typically, lumps represent a non-homogeneous mixture of the material and water with the material forming the outer surface of the lump receiving the highest percentage of moisture.

Proper blending of water with materials having a flour-like consistency requires both appropriate residence time within the conditioning vessel as well as proper mixing or agitation of the materials with water. As such, increasing the rotational speed of the beaters of conventional preconditioners in an attempt to increase agitation within the vessel causes the materials to pass through the vessel at a greater speed which correspondingly reduces the residence time of the materials within the vessel to values that may be unacceptable. On the other hand, reducing the rotational speed of the beaters to increase residence time within the vessel adversely affects the mixing characteristics of the vessel to the point where proper blending of the materials with water is not achieved. Increasing the overall length of the vessel is not desirable because of mechanical problems associated with the mixing shafts.

Moreover, the structural nature of conventional preconditioning apparatus does not lend itself to flexibility of operation where it is desired, for example, to use one apparatus for processing different materials at varying flow rates. That is, temporarily increasing the length of the apparatus with modular vessel sections in an attempt to increase residence time of materials within the vessel is not a satisfactory solution due to the inherent weight and structural characteristics of the apparatus as well as the predefined material inlets and outlets which are often located at specified positions to pass the materials from one processing stage to the next. As such, it would be desirable to provide a means for varying the residence time of materials passing through a preconditioning apparatus to enable the latter to process different types of materials at optionally varying flow rates.

U.S. Pat. No. 4,752,139 (incorporated by reference herein) describes a class of preconditioners having differently-sized, arcuate mixing chambers with a mixing shaft along the center line of each chamber. The mixing shafts include radially-extending, intercalated mixing elements. In the preconditioners of the '139 patent, the shafts are powered through a single drive motor, using appropriate gearing to maintain a constant speed differential (usually 2:1) between the mixing shafts. These preconditioners are commercialized by Wenger Mfg. Co. of Sabetha, Kans. and have proven to be a significant improvement in the art by increasing system through-puts without corresponding additional operating costs. However, the fixed speed differential design of the preconditioners of the '139 patent can sometimes represent an operational drawback by limiting the range of operational parameters which may otherwise be desirable.

SUMMARY OF THE INVENTION

The present invention overcomes the problems outlined above and provides dual shaft preconditioners capable of independent shaft rotational speeds. Broadly, the preconditioners of the invention comprise an elongated mixing vessel having a material inlet and a material outlet, with a pair of elongated mixing shafts each having a plurality of mixing elements, the shafts located in laterally spaced apart relationship within the vessel. A pair of variable drive mechanisms respectively are coupled with the shafts in order to permit selective rotation of the shafts at individual rotational speeds independent of each other. Such shaft rotation is controlled by means of a control device operably coupled with the drive mechanisms to independently control the rotational speed of the shafts.

In preferred forms, the preconditioner mixing vessel includes a pair of arcuate, juxtaposed, intercommunicated chambers of different cross-sectional areas, each equipped with a mixing shaft substantially along the center line thereof. In addition, the preconditioner is preferably supported on a weighing device to weigh the contents of the preconditioner during use thereof thereby affording a means to readily alter the material retention time within the preconditioner. The weighing device is normally in the form of a plurality of load cells operatively coupled with the preconditioner control device.

In alternate forms, the preconditioner may be of the type having juxtaposed, intercommunicated chambers of the same cross sectional area, each equipped with a mixing shaft along the centerline thereof. This type of preconditioner may also be equipped with weighing devices so as to facilitate easy changes of retention time.

DETAILED DESCRIPTION OF THE PREFERRED EMBODIMENT

Embodiment of FIGS. 1-5

Figure 1:
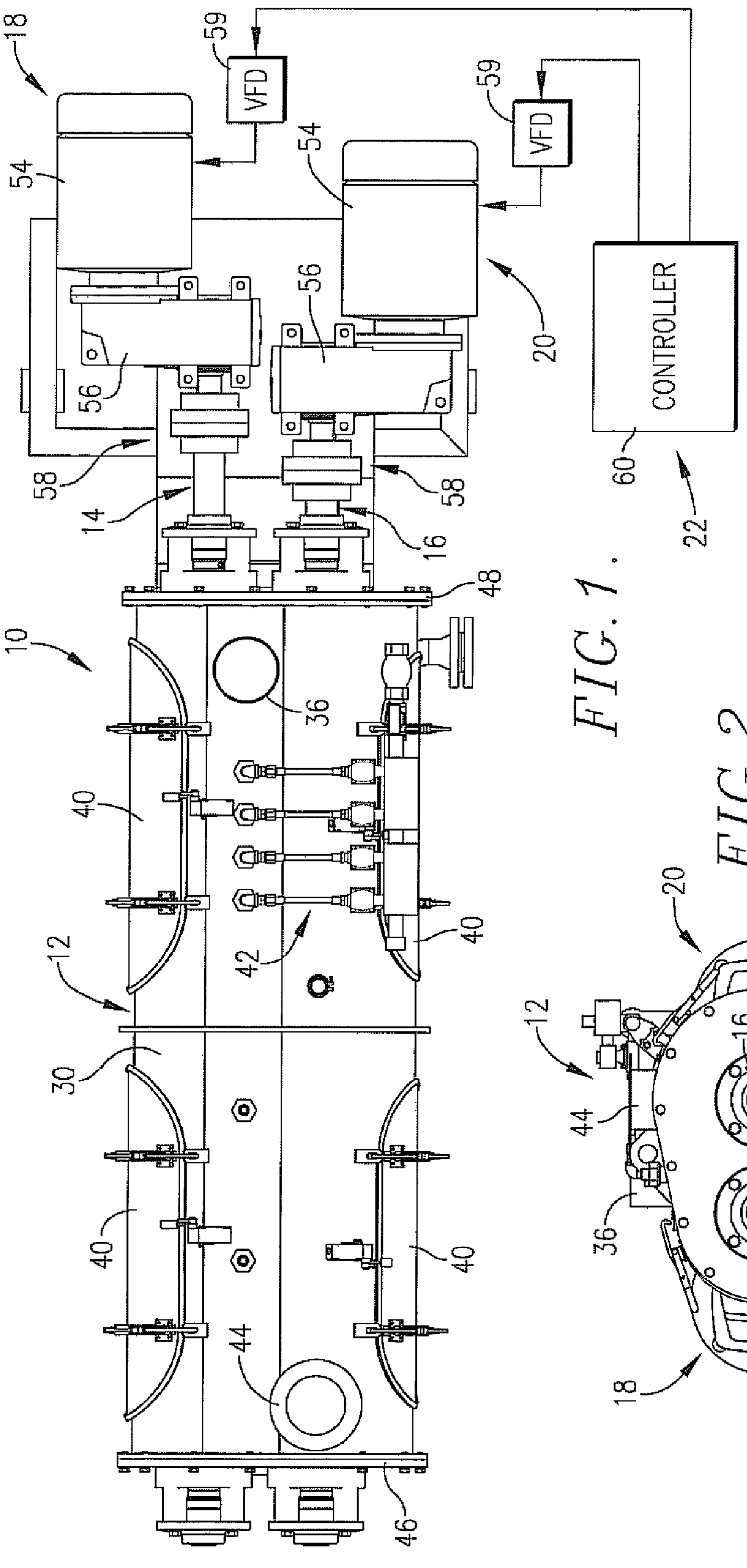
FIG. 1 is a somewhat schematic plan view of a preconditioner in accordance with the invention.
Figure 2:
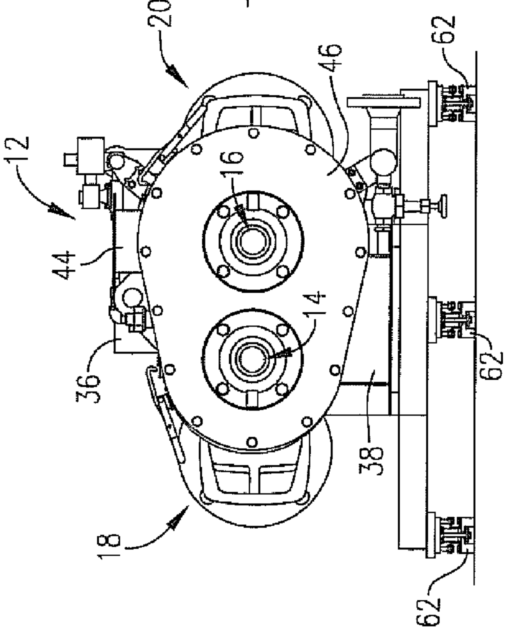
FIG. 2 is a front elevational view of the preconditioner of FIG. 1.
Figure 5:
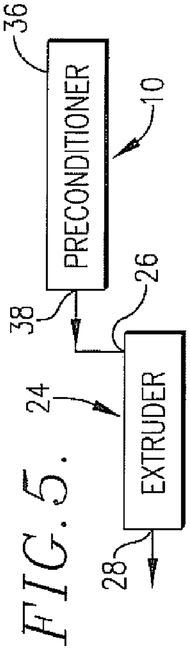
FIG. 5 is a schematic diagram of the interconnection between the preconditioner of the invention and an extruder.
Figure 3:
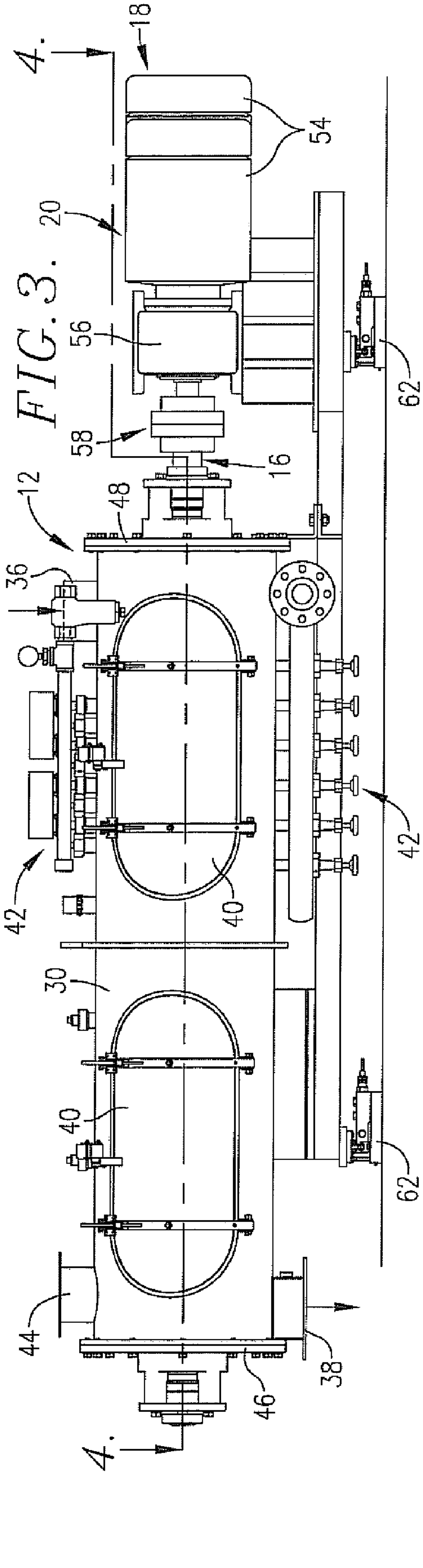
FIG. 3 is a side elevational view of the preconditioner of FIG. 1.
Figure 4:
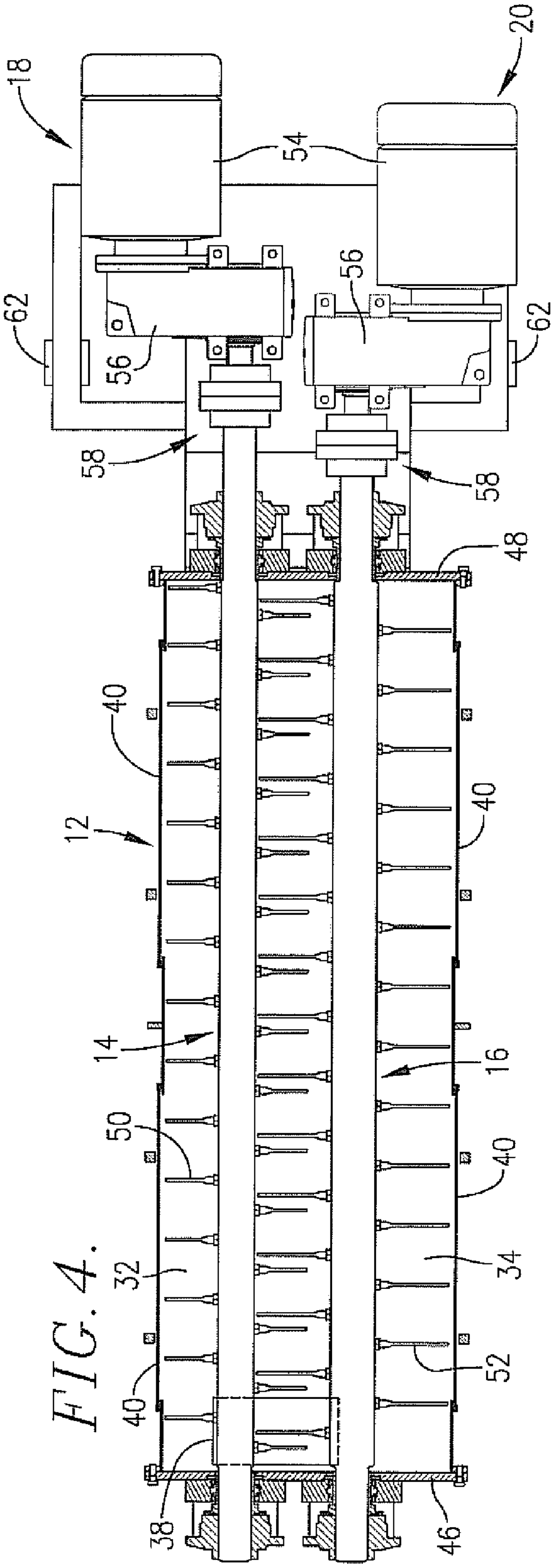
FIG. 4 is a sectional view taken along line 4-4 of FIG. 3.

Turning now to the drawings, an improved preconditioner 10 is depicted in FIGS. 1-4. Broadly, the preconditioner 10 includes an elongated mixing vessel 12 with a pair of parallel, elongated, axially-extending mixing shafts 14 and 16 within and extending along the length thereof. The shafts 14, 16 are operably coupled with individual variable drive devices 18 and 20, the latter in turn connected with digital control device 22. The preconditioner 10 is adapted for use with a downstream processing device such as an extruder or pellet mill. As depicted in FIG. 5, the preconditioner 10 is coupled with an extruder 24 (which may be of the single or twin screw variety) having an inlet 26 and a restricted orifice die outlet 28, as well as an internal, axially rotatable screw.

In more detail, the vessel 12 has an elongated, transversely arcuate sidewall 30 presenting a pair of elongated, juxtaposed, intercommunicated chambers 32 and 34, as well as a material inlet 36 and a material outlet 38. The chamber 34 has a larger cross-sectional area than the adjacent chamber 32, as will be readily apparent from a consideration of FIG. 4. The sidewall 30 has access doors 40 and is also equipped with injection assemblies 42 for injection of water and/or steam into the confines of vessel 12 during use of the preconditioner, and a vapor outlet 44. The opposed ends of vessel 12 have end plates 46 and 48, as shown.

Each of the shafts 14, 16 has a plurality of radially outwardly-extending mixing elements 50 and 52 which are designed to agitate and mix material fed to the preconditioner, and to convey the material from inlet 36 towards and out outlet 38. It will be observed that the elements 50 are axially offset relative to the elements 52, and that the elements 50, 52 are intercalated (i.e., the elements 52 extend into the cylindrical operational envelope presented by shaft 14 and elements 50, and vice versa). Although the elements 50, 52 are illustrated as being substantially perpendicular to the shafts 14, 16, the invention is not so limited; rather, the elements 50, 52 are adjustable in both length and pitch, at the discretion of the user. Again referring to FIG. 4, it will be seen that the shaft 14 is located substantially along the center line of chamber 32, and that shaft 16 is likewise located substantially along the center line of the chamber 34.

The drives 18 and 20 are in the illustrated embodiment identical in terms of hardware, and each includes a drive motor 54, a gear reducer 56, and coupling assembly 58 serving to interconnect the corresponding gear reducer 56 and motor 54 with a shaft 14 or 16. The drives 18 and 20 also preferably have variable frequency drives 59 which are designed to permit selective, individual rotation of the shafts 14, 16 in terms of speed and/or rotational direction independently of each other. In order to provide appropriate control for the drives 18 and 20, the drives 57 are each coupled with a corresponding motor 54 and a control device 60. The control device 60 may be a controller, processor, application specific integrated circuit (ASIC), or any other type of digital or analog device capable of executing logical instructions. The device may even be a personal or server computer such as those manufactured and sold by Dell, Compaq, Gateway, or any other computer manufacturer, network computers running Windows NT, Novel Netware, Unix, or any other network operating system. The drives 57 may be programmed as desired to achieve the ends of the invention, e.g., they may be configured for different rotational speed ranges, rotational directions and power ratings.

In preferred forms, the preconditioner 10 is supported on a weighing device in the form of a plurality of load cells 62, which are also operatively coupled with control device 60. The use of load cells 62 permits rapid, on-the-go variation in the retention time of material passing through vessel 12, as described in detail in U.S. Pat. No. 6,465,029, incorporated by reference herein.

The use of the preferred variable frequency drive mechanisms 18, 20 and control device 60 allow high-speed adjustments of the rotational speeds of the shafts 14, 16 to achieve desired preconditioning while avoiding any collisions between intermeshing mixing elements 50, 52. In general, the control device 60 and the coupled drives 57 communicate with each drive motor 54 to control the shaft speeds. Additionally, the shafts 14, 16 can be rotated in different or the same rotational directions at the discretion of the operator.

Retention times for material passing through preconditioner 10 can be controlled manually by adjusting shaft speed and/or direction, or, more preferably, automatically through control device 60. Weight information from the load cells 62 is directed to control device 60, which in turn makes shaft speed and/or directional changes based upon a desired retention time.

The preconditioner 10 is commonly used for the processing of animal feed or human food materials, such as grains (e.g., wheat, corn, oats, soy), meat and meat by-products, and various additives (e.g., surfactants, vitamins, minerals, colorants). Where starch-bearing grains are processed, they are typically at least partially gelatinized during passage through the preconditioner. The preconditioner 10 is usually operated at temperatures of from about 100-212 degrees F., residence times of from about 30 seconds-5 minutes, and at atmospheric or slightly above pressures.

The drive arrangement for the preconditioner 10 has the capability of rotating the shafts 14, 16 at variable speeds of up to about 1,000 rpm, more preferably from about 200-900 rpm. Moreover, the operational flexibility of operation inherent in the preconditioner design allows for greater levels of cook (i.e., starch gelatinization) as compared with similarly sized conventional preconditioners.

Figure 6:
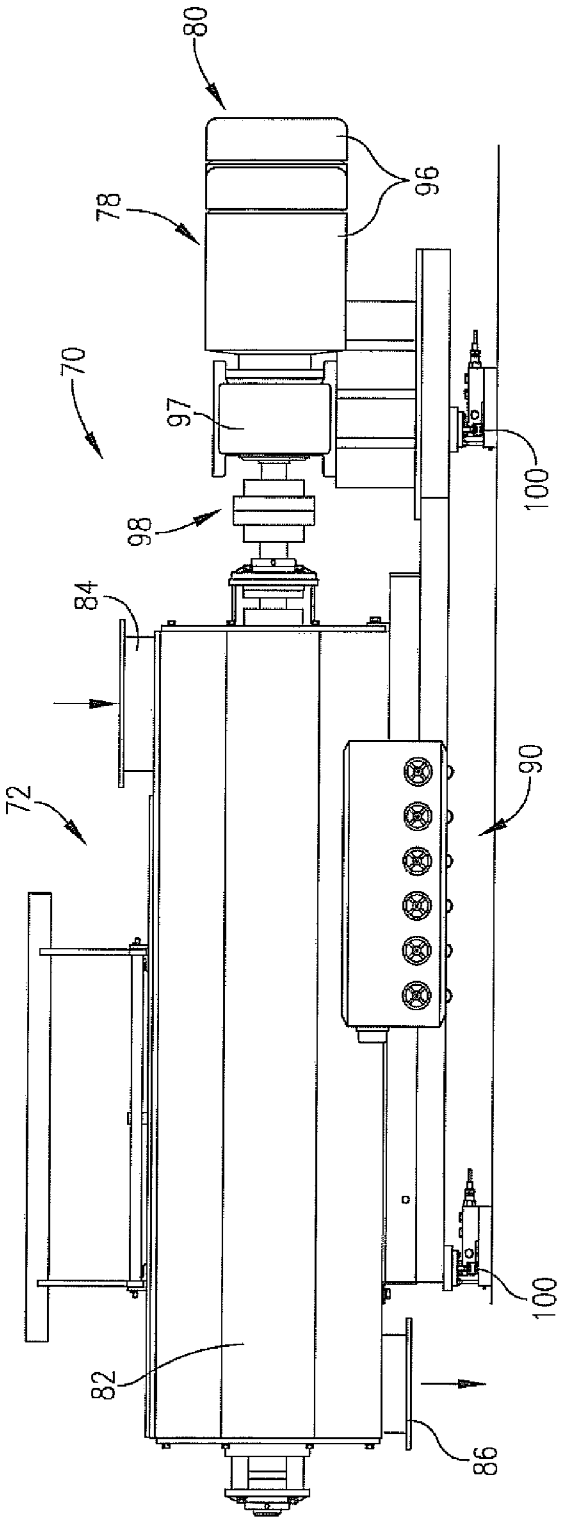
FIG. 6 is a side view of another type of preconditioner in accordance with the invention.
Figure 7:
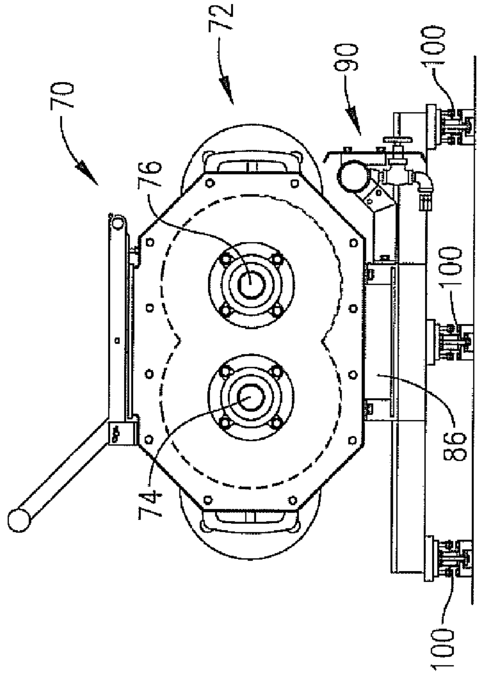
FIG. 7 is an end view thereof.
Figure 8:
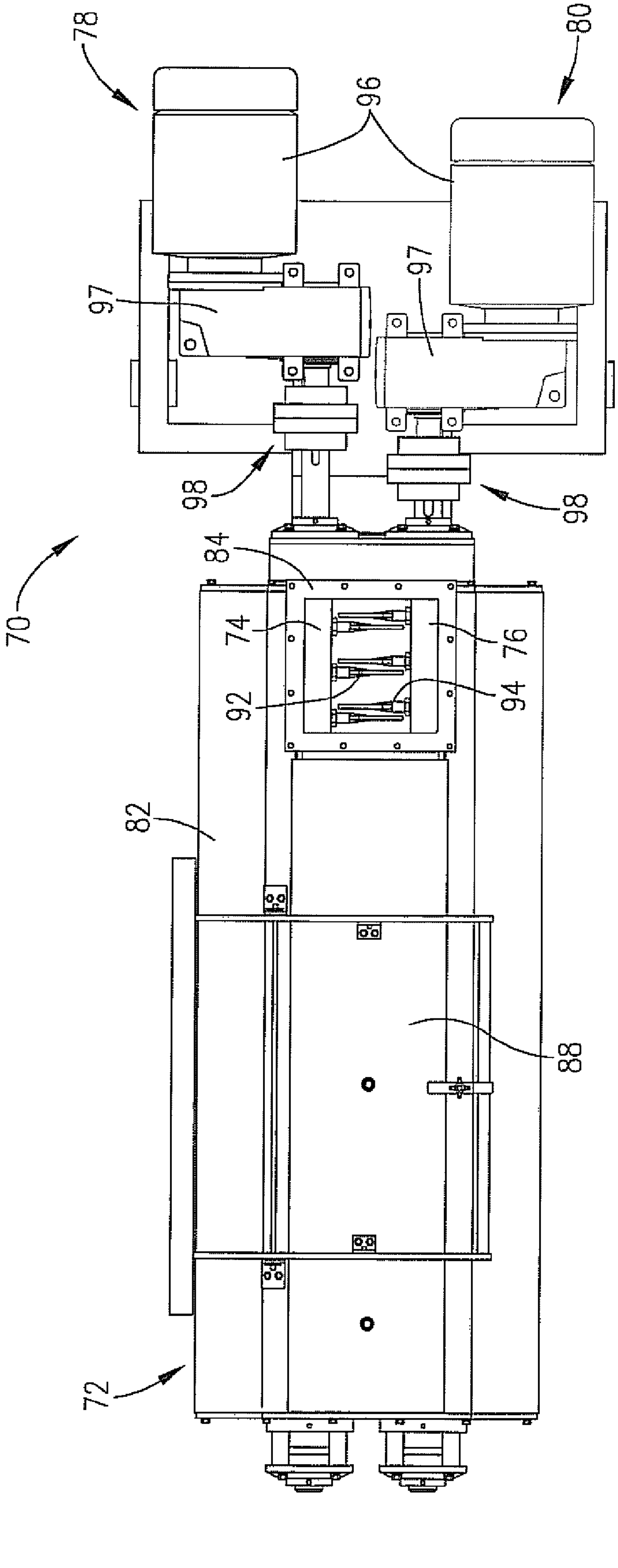
FIG. 8 is a plan view thereof.
Figure 9:
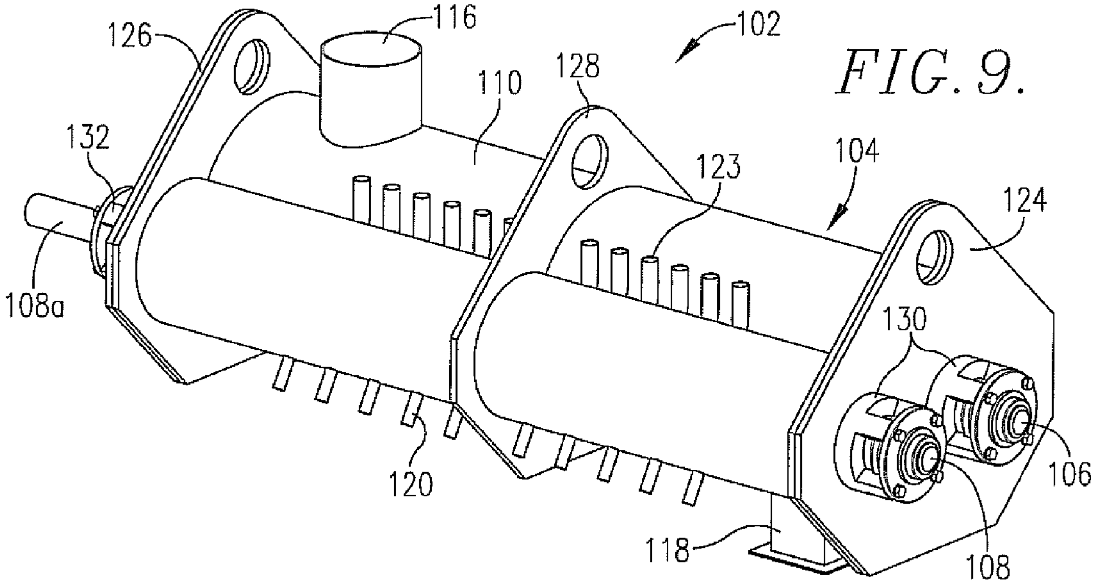
FIG. 9 is a perspective view of another preconditioner embodiment in accordance with the invention.
Figure 12:
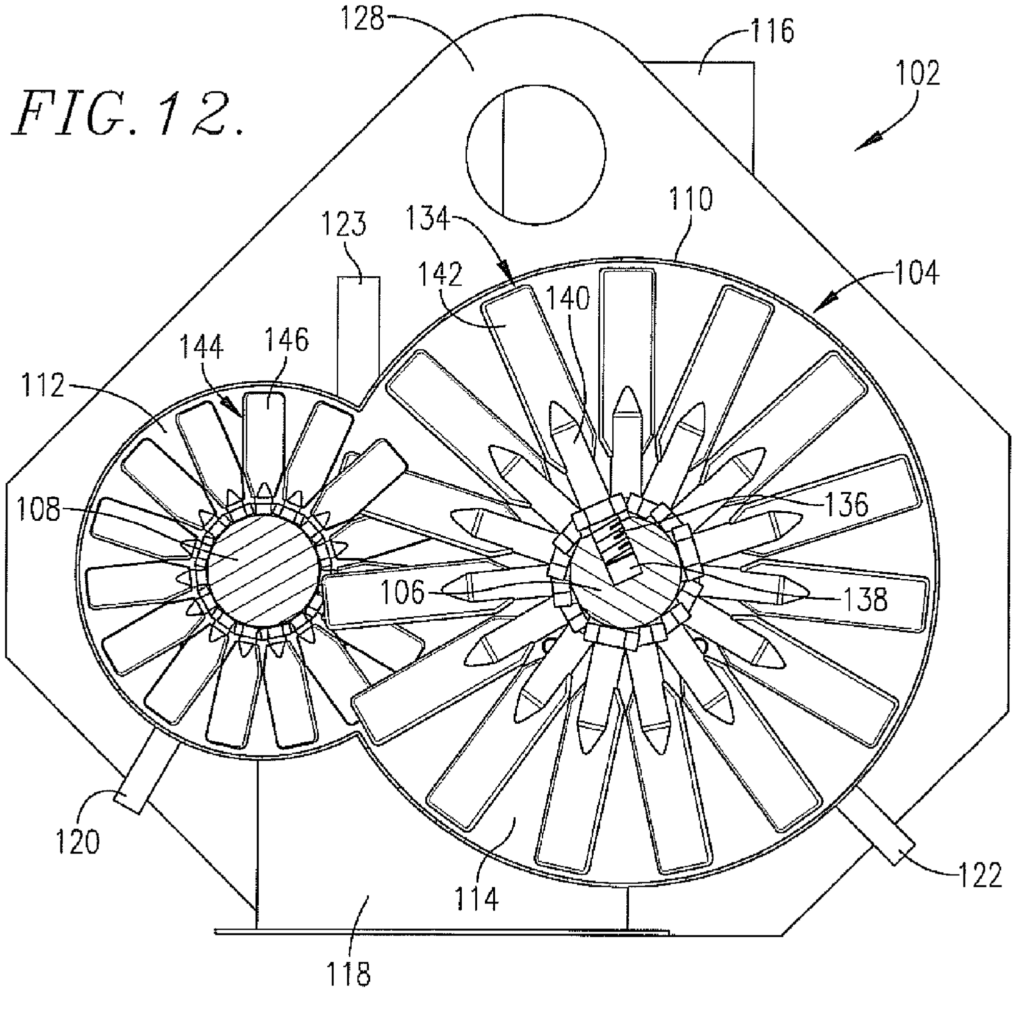
FIG. 12 is a sectional view taken along line 12-12 of FIG. 10.
Figure 10:
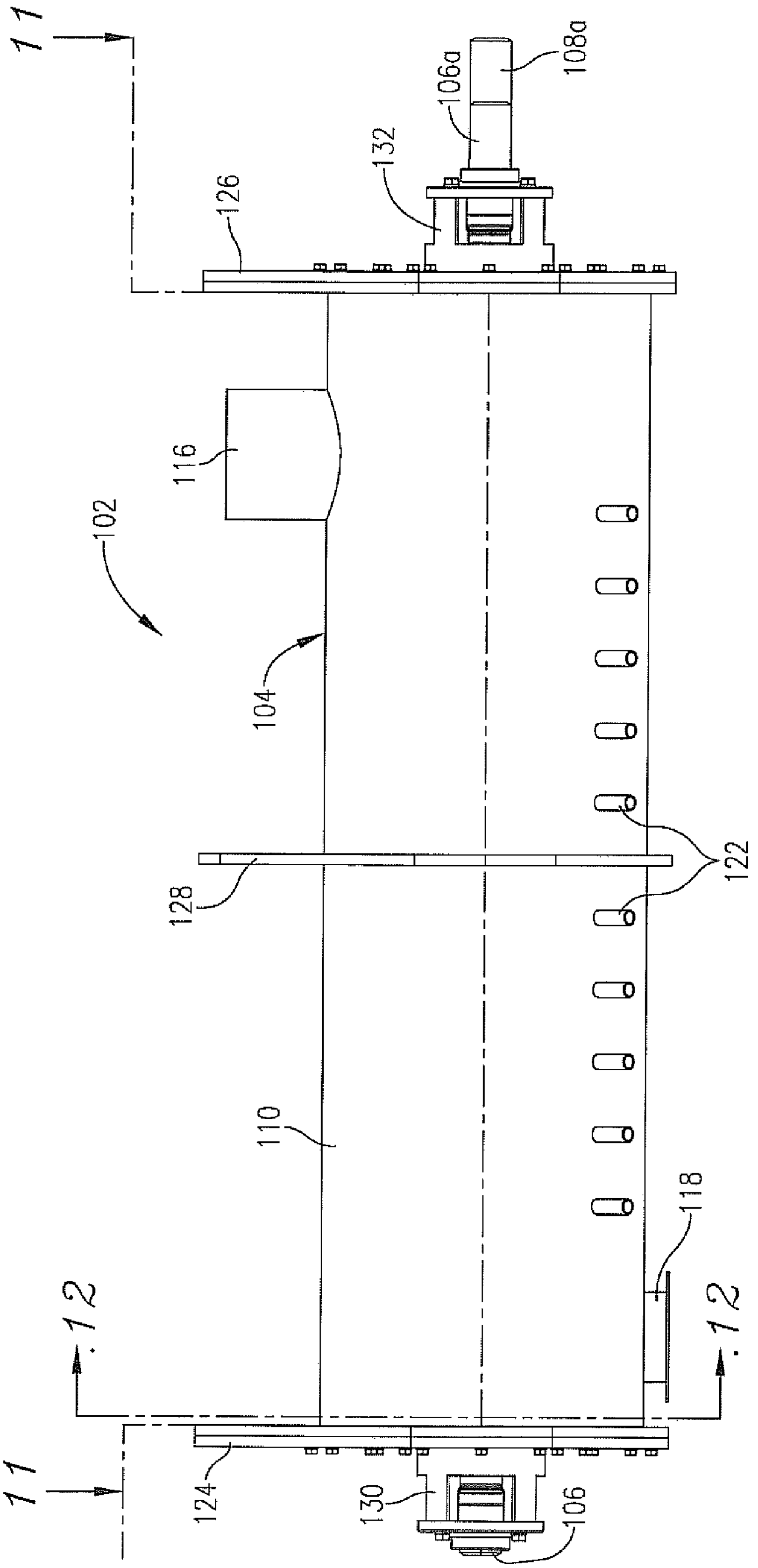
FIG. 10 is a side elevational view of the preconditioner illustrated in FIG. 9.

Embodiment of FIGS. 6-8

This embodiment is in many respects similar to that described above, and provides a preconditioner 70 having an elongated mixing vessel 72 with a pair of parallel, elongated, axially-extending shafts 74, 76 within and extending along the length thereof. The shaft 74, 76 are operably coupled with individual variable drive devices 78, 80, the latter in turn connected with digital control device (not shown) similar to control device 22 described previously. The preconditioner 70 may be used with downstream processing equipment such as extruders or pellet mills.

The vessel 72 has an elongated, transversely arcuate sidewall 82 presenting a pair of elongated, juxtaposed, intercommunicated chambers of equal cross sectional area, as well as a material inlet 84 and a material outlet 86. The sidewall 82 has an access door 88 and is also equipped with injection assemblies 90 for injection of water and/or steam into the vessel 82 during use of the preconditioner.

As in the first embodiment, each of the shafts 74, 76 has a plurality of outwardly extending mixing elements 92, 94 mounted thereon and normally extending the full length of the respective shafts. The elements 92, 94 are axially offset and intercalated as illustrated in FIG. 8, and are designed to agitate and mix material fed to the preconditioner and to convey the material from inlet 84 toward an out outlet 86.

The drives 78, 80 are identical, each having a drive motor 96, gear reducer 97 and coupler 98. The drives are preferably variable frequency drives designed to present selective, individual rotation of the shafts 74, 76 independently of each other.

The preconditioner 70 is supported on a weighing device comprising a plurality of load cells 100 which are operatively coupled with the preconditioner control device. The load cell permits variation in retention time all as described in U.S. Pat. No. 6,465,029.

The preconditioner 72 may be used in the same fashion and under the same general operative parameters as described in connection with the embodiment of FIGS. 1-5.

Embodiment of FIGS. 9-12

The preconditioner 102 includes an elongated, dual-stage mixing vessel 104 with a pair of parallel, elongated, axially extending and rotatable mixing shafts 106 and 108 along the length thereof. The shafts 106, 108 are coupled with individual variable drive devices (not shown), as in the case of the earlier-described embodiments. These variable drive devices are in turn connected to a digital control device, also not shown, The preconditioner 102 is likewise adapted for connection with a downstream extruder or pellet mill.

The vessel 104 has an elongated, transversely arcuate sidewall 110 presenting a pair of elongated, juxtaposed, interconnected chambers 112 and 114, as well as a material inlet 116 and a material outlet 118. The chamber 114 has a larger cross sectional area than the adjacent chamber 112, which is important for reasons to be described. Each of the chambers 112, 114 is equipped with a series of spaced apart inlet ports 120, 122 along the lengths of the corresponding chambers, and an intermediate set of ports 123 is located at the juncture of the chambers 112, 114. These ports 120, 122 are adapted for connection of water and/or steam injectors leading to the interiors of the chambers. The overall vessel 104 further has fore and aft end plates 124 and 126, as well as, a central plate 128.

As illustrated, the shafts 106, 108 are essentially centrally located within the corresponding chambers 112, 114. To this end, forward bearings 130 mounted on plate 124 support the forward ends of the shafts 106, 108, and similarly rear bearings 132 secured to plate 126 support the rear ends of the shafts. The shafts 106, 108 have rearwardly extending extensions **106*a*, 108*a* projecting from the bearings 132** to provide a connection to the variable frequency drives previously described.

Figure 11:
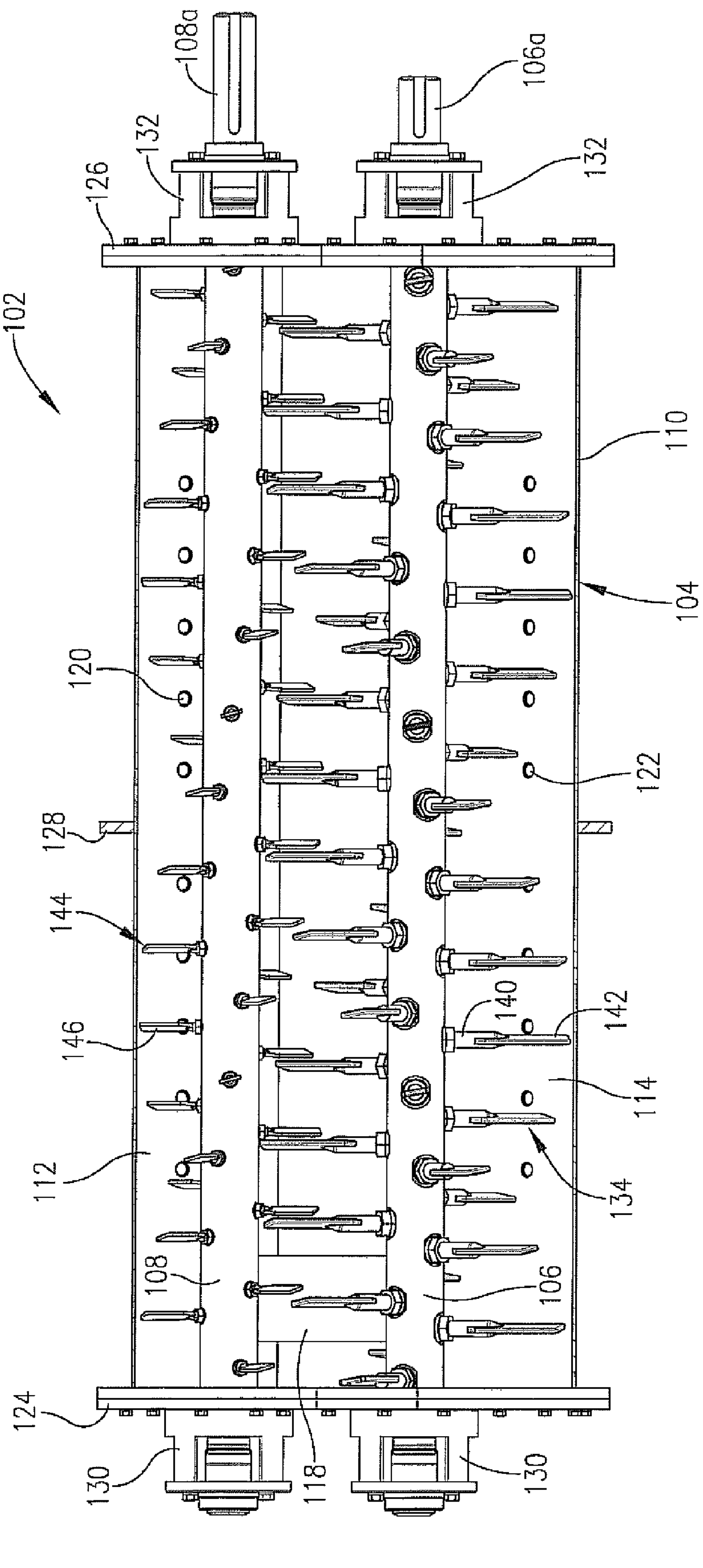
FIG. 11 is a sectional view taken along line 11-11 of FIG. 10.

The shaft 106 is equipped with a plurality of radially outwardly extending mixing elements 134 located in staggered relationship along the length of the shaft. Each of the elements 134 (FIG. 12) includes a threaded inboard segment 136 received within a correspondingly threaded bore 138 of the shaft 106, with an outwardly projecting segment 140 having a substantially flat, paddle-like member 142. As best seen in FIG. 11, the paddle members 142 of the mixing elements 134 are oriented in a reverse direction relative to the direction of travel of material from inlet 116 to outlet 118. That is, these members serve to retard the flow of material through the preconditioner 102.

The shaft 108 situated within smaller chamber 112 likewise has a series of mixing elements 144 along the length thereof in alternating, staggered relationship. The elements 144 are identical with the elements 134, save that the elements 144 are somewhat smaller in size. Each element 144 presents an outboard paddle-like member 146. In this case, the members 146 are oriented opposite that of the members 142, i.e., they are oriented in a forward direction so as to more positively advance the flow of material from inlet 116 toward and out the outlet 118.

As in the case of the earlier described embodiments, adjacent pairs of mixing elements 134 and 144 are axially offset from each other and are intercalated; thus the elements are not of self-wiping design. This allows the shafts to be rotated at greatly different rotational speeds, while avoiding any potential lock-up owing to mechanical interference between the elements 134 and 144.

The preconditioner designs of the present invention permit processing of materials to a greater degree than heretofore possible. For example, prior preconditioners of the type described in U.S. Pat. No. 4,752,139 could not be field-adjusted to achieve different relative rotational speeds between the shafts thereof. That is, in such prior preconditioners, once a rotational speed differential was established during manufacture of the device, it could not thereafter be altered without a complete reconstruction of the device. Normal preconditioners of this type had a speed differential of 2:1 between the shafts within the small and large chainbers, respectively. In the present invention, however, far greater and infinitely adjustable speed differentials can be readily accomplished. Thus, in preferred forms the speed differential between the shafts 106, 108 is at least 5:1, and typically ranges from 3:1 to 18:1. This latter differential corresponds to a rotational speed of 900 rpm for the shaft 108, and 50 rpm for the shaft 106.

This enhanced design affords a number of processing advantages. To give one example, in the prior preconditioner design of the '139 patent, the maximum degree of cook achievable was normally about 30%, with a maximum of about 43% (measured by gelatinization of starch components according to the method described in Mason et al., *A New Method for Determining Degree of Cook,* 67th Annual Meeting, American Association of Cereal Chemists (Oct. 26, 1982), incorporated by reference herein). With the present invention however, significantly greater cook percentages can be achieved, of at least 50% and more preferably at least 55%, and most preferably at least about 75%. At the same time, these enhanced cook values are obtained with the same or even shorter residence times as compared with the prior preconditioners; specifically, such prior designs would require a retention time of from about 160-185 seconds to obtain maximum cook values, whereas in the present preconditioners the retention times are much less, on the order of 120-150 seconds, to achieve this same cook. Further, if the longer typical preconditioner residence times are used, the extent of cook values are normally significantly increased.

In one form of the invention, human food or animal feed mixtures containing respective quantities of protein and starch (and normally other ingredients such as fats and sugars) are processed in the preconditioners of the invention to achieve at least about 50%, and more preferably at least about 75% cook values based upon starch gelatinization. Representative examples of such mixtures are pet and fish feeds. The preconditioner of the invention also give enhanced Specific Mechanical Energy (SME) values. Prior preconditioners typically exhibited relatively low SME values whereas the preconditioner hereof have increased SME values of from about 1.7-5.0, more preferably from about 1.9-4.5 kW-Hr/Ton of processed starting materials.

It is well understood in the art that increasing the degree of cook in a preconditioner is advantageous in that less energy and retention times are required during downstream processing to achieve a desired, fully cooked product such as a pet food. Thus, use of preconditioners in accordance with the invention increases product throughput and thus materially reduces processing costs.

EXAMPLE 1

In this Example, a standard dog food formulation was prepared and preconditioned using a preconditioner in accordance with the invention. The formulation contained 53.0% corn, 22.0% poultry meal, 15% soybean meal, and 10% corn gluten meal (all percentages by weight). This formulation was fed into the preconditioner inlet and subjected to treatment therein along with injection of steam and water. The small chamber shaft was rotated at a speed of 900 rpm in the reverse direction, whereas the large chamber shaft was rotated at 50 rpm in the forward direction. Three separate tests were conducted at different feed rates to the preconditioner, and the results of these tests are set forth in Table 1 below. As noted in Table 1, the percent cook values obtained using the preconditioner ranged from 47.6-50.9%, and total SME values varied from 1.97-3.49 kW-Hr/Ton.

TABLE 1

| Name | Test 1 | Test 2 | Test 3 |
|---|---|---|---|
| Feed Rate (lbs/hr) | 5,000 | 9,000 | 10,000 |
| Cylinder Water (lbs/hr) | 850 | 1,600 | 1,700 |
| Cylinder Steam (lbs/hr) | 610 | 1,221 | 1,306 |
| Cylinder Oil (lbs/hr) | 0 | 0 | 0 |
| DDC Small (L) Shaft Direction (F or R)[1] | R | R | R |
| DDC Small (L) Shaft Speed (RPM) | 900 | 900 | 900 |
| DDC Small (L) Shaft Load (%) | 51.0% | 56.0% | 57.0% |
| DDC Small (L) HP | 15 | 15 | 15 |
| DDC Large (R) Shaft Direction (F or R) | F | F | F |
| DDC Large (R) Shaft Speed (RPM) | 50 | 50 | 50 |
| DDC Large (R) Shaft Load (%) | 27.0% | 33.0% | 31.0% |
| DDC Large (R) HP | 15 | 15 | 15 |
| Cylinder Weight (lbs) | 293 | 345 | 350 |
| Cylinder Retention Time (Minutes) | 2.72 | 1.75 | 1.61 |
| Cylinder Downspout Temp (Deg F.) | 200 | 199 | 200 |
| DDC Small (L) SME (kW-Hr/Ton) | 2.28 | 1.39 | 1.28 |
| DDC Large (R) SME (kW-Hr/Ton) | 1.21 | 0.82 | 0.69 |
| Total DDC Calc'd SME (kW-Hr/Ton) | 3.49 | 2.21 | 1.97 |
| Moisture (MCWB %) | 13.01 | 12.74 | 14.51 |
| Total Starch | 35.65 | 34.61 | 34.7 |
| Gelatinized Starch | 17.28 | 17.61 | 16.52 |
| % Cook | 48.5 | 50.9 | 47.6 |

[1]F refers to the forward direction and R refers to the rearward direction. Directionality is achieved by orientation of the shaft mixing paddles and/or use of oppositely rotating shafts. In the present Examples, the shafts were rotated in the same direction, and in the F direction the paddles are oriented to move the mixture forwardly, whereas in the R direction the paddles are oriented to retard the forward movement of the mixture.

EXAMPLE 2

In this Example, a standard cat food formulation was prepared and preconditioned as set forth in Example 1. The cat food formulation contained 32% poultry meal, 28% corn, 14% rice, 13% corn gluten meal, 3% beat pulp, 2% phosphoric acid (54% $H_3PO_4$), and 8% poultry fat (all percentages by weight). In the three separate test runs, the small chamber shaft was rotated at 800 rpm in the reverse direction while the large chamber shaft rotated at 50 rpm in the forward direction. The results of these tests are set forth in Table 2 below, where percent cook varied from 45.8 to 48.1% and total SME values ranged from 2.9 to 3.9 kW-Hr/Ton.

TABLE 2

| Name | Test 4 | Test 5 | Test 6 |
|---|---|---|---|
| Feed Rate (lbs/hr) | 4,000 | 4,000 | 4,000 |
| Cylinder Water (lbs/hr) | 760 | 760 | 1,140 |
| Cylinder Steam (lbs/hr) | 580 | 580 | 840 |
| Cylinder Oil (lbs/hr) | 200 | 280 | 0 |
| DDC Small (L) Shaft Direction (F or R) | R | R | R |
| DDC Small (L) Shaft Speed (RPM) | 800 | 800 | 800 |

TABLE 2-continued

| Name | Test 4 | Test 5 | Test 6 |
|---|---|---|---|
| DDC Small (L) Shaft Load (%) | 40.0% | 40.0% | 42.0% |
| DDC Small (L) HP | 15 | 15 | 15 |
| DDC Large (R) Shaft Direction (F or R) | F | F | F |
| DDC Large (R) Shaft Speed (RPM) | 50 | 50 | 50 |
| DDC Large (R) Shaft Load (%) | 28.0% | 29.0% | 35.0% |
| DDC Large (R) HP | 15 | 15 | 15 |
| Cylinder Weight (lbs) | 286 | 288 | 310 |
| Cylinder Retention Time (Minutes) | 3.21 | 3.24 | 2.33 |
| Cylinder Downspout Temp (Deg F.) | 200 | 200 | 201 |
| DDC Small (L) SME (kW-Hr/Ton) | 2.10 | 2.10 | 1.60 |
| DDC Large (R) SME (kW-Hr/Ton) | 1.70 | 1.80 | 1.30 |
| Total DDC Calc'd SME (kW-Hr/Ton) | 3.80 | 3.90 | 2.90 |
| Moisture (MCWB %) | 9.88 | 9.75 | 9.91 |
| Total Starch | 34.61 | 32.77 | 33.83 |
| Gelatinized Starch | 15.84 | 15.78 | 16.09 |
| % Cook | 45.8 | 48.1 | 47.6 |

EXAMPLE 3

In this Example, a floating aquatic feed formulation used in the manufacture of catfish feeds was prepared and preconditioned as set forth in Example 1. The floating aquatic feed formulation contained 20% whole corn, 20% fish meal, 20% de-fatted rice bran, 15% wheat midlings, 10% soybean meal, 10% beat pulp, and 5% wheat (all percentages by weight). The three separate test runs, the small diameter shaft was rotated at 800 rpm in the reverse direction and the large diameter shaft was rotated at 50 rpm in the forward direction. These results are set forth in Table 3 where it can be seen that the cook varied from 78.7-84.5% and the total SME values were 3.7 kW-Hr/Ton.

TABLE 3

| Name | Test 7 | Test 8 | Test 9 |
|---|---|---|---|
| Feed Rate (lbs/hr) | 4,000 | 4,000 | 4,000 |
| Cylinder Water (lbs/hr) | 1,280 | 1.360 | 1.520 |
| Cylinder Steam (lbs/hr) | 1,200 | 1,200 | 1.200 |
| Cylinder Oil (lbs/hr) | 0 | 0 | 0 |
| DDC Small (L) Shaft Direction (F or R) | R | R | R |
| DDC Small (L) Shaft Speed (RPM) | 800 | 800 | 800 |
| DDC Small (L) Shaft Load (%) | 37.0% | 37.0% | 37.0% |
| DDC Small (L) HP | 15 | 15 | 15 |
| DDC Large (R) Shaft Direction (F or R) | F | F | F |
| DDC Large (R) Shaft Speed (RPM) | 50 | 50 | 50 |
| DDC Large (R) Shaft Load (%) | 29.0% | 29.0% | 29.0% |
| DDC Large (R) HP | 15 | 15 | 15 |
| Cylinder Weight (lbs) | 284 | 285 | 286 |
| Cylinder Retention Time (Minutes) | 2.63 | 2.61 | 2.55 |
| Cylinder Downspout Temp (Deg F.) | 204 | 204 | 204 |
| DDC Small (L) SME (kW-Hr/Ton) | 2.10 | 2.10 | 1.60 |
| DDC Large (R) SME (kW-Hr/Ton) | 1.60 | 1.60 | 1.60 |
| Total DDC Calc'd SME (kW-Hr/Ton) | 3.70 | 3.70 | 3.70 |
| Moisture (MCWB %) | 36.22 | 35.89 | 35.28 |
| Total Starch | 27.49 | 26.87 | 28.87 |
| Gelatinized Starch | 21.63 | 22.05 | 21.86 |
| % Cook | 78.70 | 82.10 | 84.50 |

EXAMPLE 4

In this Example, a sinking aquatic feed formulation used in the manufacture of Sea Bass/Sea Breem feeds was prepared and preconditioned as set forth in Example 1. The sinking aquatic feed formulation was made up of 53.5% soybean meal, 15% wheat, 8.5% corn gluten feed, 6.0% corn, 1% sunflower meal, and 16% fish oil. In three separate tests, the small chamber shaft was rotated at 800 rpm in the reverse direction and the large diameter shaft was rotated at 50 rpm in the forward direction. These results are set forth in Table 4, where it will be seen that percent cook ranges from 72.5-75.8% and total SME values were from 2.2-3.2 kW-Hr/Ton.

TABLE 4

| Name | Test 10 | Test 11 | Test 12 |
|---|---|---|---|
| Feed Rate (lbs/hr) | 5,000 | 7,000 | 9,000 |
| Cylinder Water (lbs/hr) | 940 | 1,330 | 1,710 |
| Cylinder Steam (lbs/hr) | 716 | 940 | 1,330 |
| Cylinder Oil (lbs/hr) | 350 | 490 | 270 |
| DDC Small (L) Shaft Direction (F or R) | R | R | R |
| DDC Small (L) Shaft Speed (RPM) | 800 | 800 | 800 |
| DDC Small (L) Shaft Load (%) | 45.0% | 49.0% | 54.0% |
| DDC Small (L) HP | 15 | 15 | 15 |
| DDC Large (R) Shaft Direction (F or R) | F | F | F |
| DDC Large (R) Shaft Speed (RPM) | 50 | 50 | 50 |
| DDC Large (R) Shaft Load (%) | 31.0% | 36.0% | 39.0% |
| DDC Large (R) HP | 15 | 15 | 15 |
| Cylinder Weight (lbs) | 306 | 334 | 357 |
| Cylinder Retention Time (Minutes) | 2.62 | 2.05 | 1.74 |
| Cylinder Downspout Temp (Deg F.) | 201 | 199 | 199 |
| DDC Small (L) SME (kW-Hr/Ton) | 1.90 | 1.60 | 1.30 |
| DDC Large (R) SME (kW-Hr/Ton) | 1.30 | 1.10 | 0.90 |
| Total DDC Calc'd SME (kW-Hr/Ton) | 3.20 | 2.70 | 2.20 |
| Moisture (MCWB %) | 11.32 | 12.72 | 13.14 |
| Total Starch | 11.74 | 12.05 | 12.52 |
| Gelatinized Starch | 8.63 | 9.14 | 9.08 |
| % Cook | 73.50 | 75.80 | 72.50 |

We claim:

1. In a method of preconditioning a food or feed mixture including respective quantities of protein and starch and comprising the steps of passing the mixture into and through a preconditioning vessel equipped with a pair of elongated, axially rotatable shafts each having a plurality of outwardly extending mixing elements with the mixing elements of the shafts being axially offset and intercalated, and rotating said shafts during said passage of said material through the vessel, the improvement which comprises the step ofprocessing the mixture to achieve a specific mechanical energy (SME) imparted to said food or feed mixture of from 1.7-5.0 kW-Hr/Ton of said food or feed mixture, said processing step comprising the steps of rotating said shafts at different speeds respectively, with the rotational speed differential between the shafts ranging from 3:1 to 18:1, and heating the food or feed mixture within the vessel to a temperature of from about 100-212° F.

2. The method of claim 1, said imparted SME being from 1.9-4.5 kW-Hr/Ton.

3. The method of claim 1, including the step of injecting steam into said vessel during said passage of said mixture therethrough.

4. The method of claim 1, the elements of said shafts oriented to avoid any collision between the elements during shaft rotation, said method including the step of adjusting the rotational speed of said shafts during said rotation thereof.

5. The method of claim 1, the elements of said shafts oriented to avoid any collision between the elements during shaft rotation, said method comprising the step of rotating said shafts in opposite directions.

6. The method of claim 1, including the step of processing the food or feed mixture within said vessel for a period of 120-150 seconds.

7. The method of claim 1, including the step of processing the food or feed mixture at a pressure of atmospheric or slightly above.

8. The method of claim 1, said rotational speed differential being infinitely adjustable.

* * * * *